(12) United States Patent
Takahashi et al.

(10) Patent No.: US 8,817,794 B2
(45) Date of Patent: Aug. 26, 2014

(54) NETWORK SYSTEM AND COMMUNICATION DEVICE

(75) Inventors: Kiyotaka Takahashi, Okegawa (JP); Takumi Oishi, Yokohama (JP); Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 13/348,694

(22) Filed: Jan. 12, 2012

(65) Prior Publication Data

US 2012/0243543 A1    Sep. 27, 2012

(30) Foreign Application Priority Data

Mar. 22, 2011   (JP) .................................. 2011-061878

(51) Int. Cl.
*H04L 12/56* (2006.01)
(52) U.S. Cl.
USPC .......................................................... 370/394
(58) Field of Classification Search
CPC ...................................................... H04L 12/56
USPC .......................... 370/253–340; 709/201–213
See application file for complete search history.

(56) References Cited

U.S. PATENT DOCUMENTS

| 7,573,891 | B1 * | 8/2009 | Chow et al. ................... 370/401 |
| 8,228,892 | B2 * | 7/2012 | Takahashi et al. ............ 370/350 |
| 8,687,481 | B2 * | 4/2014 | Sakurada et al. ............. 370/222 |
| 2002/0091624 | A1 | 7/2002 | Glodjo et al. | |

FOREIGN PATENT DOCUMENTS

| JP | 10-200581 A | 7/1998 |
| JP | 11-259386 A | 9/1999 |
| JP | 2003-69613 A | 3/2003 |
| JP | 2004-537076 A | 12/2004 |
| JP | 2007-336191 A | 12/2007 |
| JP | 2009-105820 A | 5/2009 |

OTHER PUBLICATIONS

Japanese Office Action dated Jan. 28, 2014 (Two (2) pages).

* cited by examiner

*Primary Examiner* — Ayaz Sheikh
*Assistant Examiner* — Debebe Asefa
(74) *Attorney, Agent, or Firm* — Crowell & Moring LLP

(57) ABSTRACT

It is ensured to prevent a user from misrepresenting a time stamp, and to send out packets in sequence in which the packets are accepted to all users who are geographically isolated from each other. A unique time stamp impartation function is realized by respective communication devices on a net inside an administrative responsibility range of a communication common carrier, hardly accessible by a user. If a packet with a time stamp imparted by a subscriber terminal, provided thereto, is received, the respective communication devices positioned on the net inside the administrative responsibility range nullify the relevant time stamp in order to prevent misrepresentation of the time stamp, by a user outside the administrative responsibility range, and restores the packet from the subscriber together with the time stamp when transferring the packet to the outside of the administrative responsibility range.

12 Claims, 9 Drawing Sheets

NETWORK SYSTEM AND COMMUNICATION DEVICE

CLAIM OF PRIORITY

The present application claims priority from Japanese patent application JP 2010-061878 filed on Mar. 22, 2011, the content of which is hereby incorporated by reference into this application.

FIELD OF THE INVENTION

The present invention relates to a network system for guaranteeing input-output sequence of a packet to a net, and a communication device.

BACKGROUND TECHNOLOGY

With a communication service provided by a communication common carrier as of today, sequence in which packets sent out to an identical address by a plurality of users who are geographically apart from each other enter a net of the communication common carrier is not necessarily equal to sequence in which the packets at the address outgoes from the net because transmission delay varies due to a difference in physical distance, and so forth, occurring between the user, and the address, or between the users.

Accordingly, in the case of a transaction in which a processed result is dependent on sequence of executions of processing, including an electronic commercial transaction via a network such as, for example, an internet auction, ticket purchasing, selling/buying of stock and currency, and so forth, even a slight time difference due to transfer delay occurring between users having conflicted interests will cause advantageous/disadvantageous relationships, so that it is not possible to maintain impartiality for service provided. In the case where a processing request is transferred via a network to be then processed, the processing request sent out to the network is transferred to a relevant server, to be accompanied by transfer-delay corresponding to a physical distance up to the server for executing processing, and so forth, before being subjected to acceptance processing. That is, sequence in which the processing request is subjected to the acceptance processing will be dependent on not only sequence in which the processing request is sent out but also transfer-delay time accompanying communication.

As a method for overcoming this problem, a method is available whereby a processing request from a user is provided with a time stamp, and the processing request is rearranged in a different sequence by a server for processing a transaction. In Japanese Unexamined Patent Publication No. Hei11(1999)-259386, a server has a function for causing time synchronization between terminals used by users, and providing a processing request from a user, sent out by the terminal, with a time stamp, and the server for processing a transaction rearranges sequence in which the processing requests are processed on the basis of the time stamp imparted to each of the processing requests instead of sequence in which the requests are received, thereby implementing execution of processing according to sequence in which the processing requests are sent out.

More specifically, the following contents are disclosed in Japanese Unexamined Patent Publication No. Hei11(1999)-259386. A client machine periodically receives an absolute time from a time server, thereby executing time correction of a timer of the client machine by use of the absolute time as received. Respective client machines send out a service data request for receiving delivery of various types of services, and time data (the absolute time) of the timer to a server machine via Internet. The controller of the server machine controls the service data requests to be sequentially stored in a memory so as to be sorted out in an increasing order of the absolute time on the basis of the time data (the absolute time) imparted to the respective service data requests. Further, the server machine is provided with a timer for counting time elapsed from a time when each of the service data requests of the respective client machines arrives at the controller. The maximum transfer time of transfer time between the server machine, and the respective client machines is taken as maximum delay time, and the server machine holds each of the service data requests for a period corresponding to the maximum delay time before execution of processing of the service data requests.

SUMMARY OF THE INVENTION

In Japanese Unexamined Patent Publication No. Hei11 (1999)-259386, however, a function for dealing with the time stamp is implemented by a service request program run by the client machine, and a service-processing program run by the server machine. This means that there is a need for preparing the function for respective individual services as part of the service provided by the server and as part of function for making use of the service of the client machine to be subsequently incorporated therein. That is, use of the function will be limited to services that are provided in advance. For this reason, it is necessary for a service provider or a user, wanting to use the function, to construct a special-purpose service provided with the relevant function on a service-by-service basis. Further, in the case of Japanese Unexamined Patent Publication No. Hei11(1999)-259386, since the function for handling the time stamp is in action at the client machine, that is, at a location (e. g. the terminal operated by the user) accessible by the user, there is the risk that information on the time stamp for use as security for impartiality among users is swindled from the user by a user with a harmful intent.

It is therefore an object of the invention to provide a network system, and a communication device, capable of preventing information from being swindled by a user with a harmful intent, and providing a plurality of users geographically isolated from each other with service having guaranteed isochronism.

To that end, in accordance with one aspect of the invention, there is provided a network system comprising a net for connecting a plurality of communication devices with each other, wherein sequence-information in time synchronization with other communication devices is imparted to the packets, respectively, by the communication devices receiving packets from the outside of the net, and the packets are lined up by the communication device sending out the packets to the outside of the net on the basis of the sequence-information imparted to the packets, respectively, before sending out the packets.

Further, to that end, in accordance with another aspect of the invention, there is provided a communication device inside a net, connected with other communication devices inside the net, the communication device comprising an input processor for receiving packets from the outside of the net, and imparting time information in time synchronization with those other communication devices to the packets, respectively, and an output processor for lining up the packets on the basis of the time information imparted to the packets, respectively, by those other communication devices, thereby sending out the packets to the outside of the net.

With the present invention, it is possible to construct a network system capable of preventing information from being swindled by a user with a harmful intent, and providing all the users with service having guaranteed isochronism. Further, a service provider, or a user can prevent misrepresentation, and provide service in sequence in which requests for processing are sent out to all the users who are geographically isolated from each other without altering service as desired, thereby securing time-wise impartiality among users.

DETAILED DESCRIPTION OF THE PREFERRED EMBODIMENTS

Preferred embodiments of the invention are described hereinafter with reference to the accompanying drawings.

First Embodiment

Figure 1:
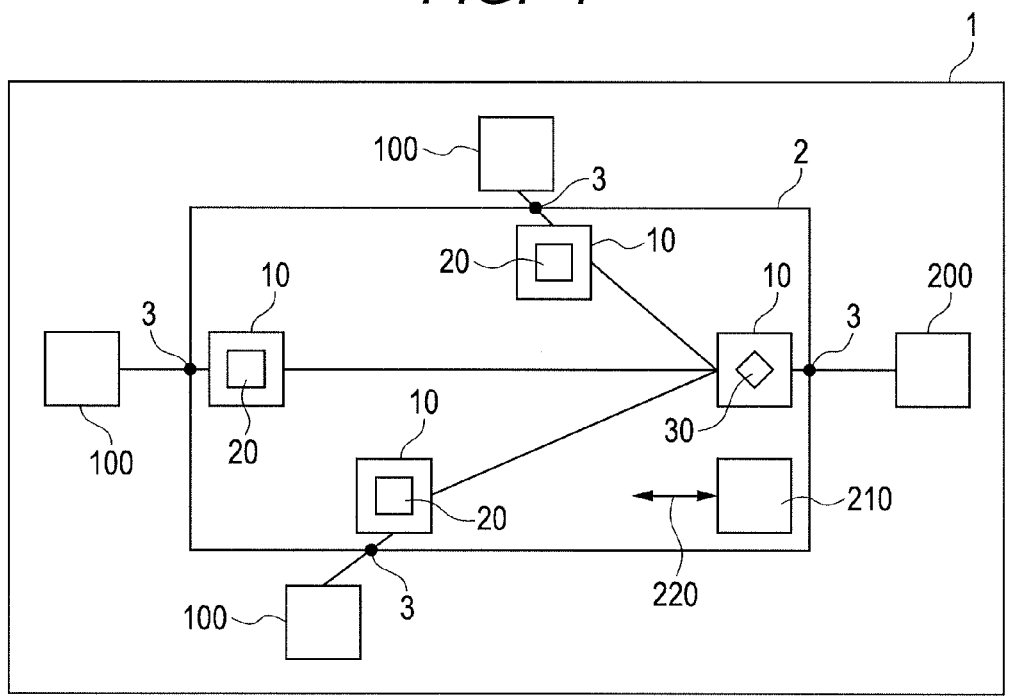
FIG. 1 is a block diagram for depicting a relationship between an administrative responsibility range of equipment according to a first embodiment of the invention, and function-layout positions of the equipment.

FIG. 1 is view for depicting a relationship between an administrative responsibility range of equipment according to a first embodiment of the invention, and function-layout positions of the equipment. In FIG. 1, reference numeral 1 denotes an administrative responsibility range of a subscriber, reference numeral 2 an administrative responsibility range of a communication common carrier, and reference numeral 3 a POI (Point of Interface). The POI 3 indicates an administrative responsibility demarcation boundary in a net that is divided into the administrative responsibility range 1 of the subscriber, and the administrative responsibility range 2 of the communication common carrier. In the present specification, apart of the net, inside the administrative responsibility 2 of the communication common carrier, is also referred to as a carrier network.

As shown in FIG. 1, a network system according to the present embodiment is comprised of a subscriber terminal 100, a destination server 200 providing service to be used from the subscriber terminal, and a communication device 10 of which a communication common carrier make use in order to provide a communication service. A configuration according to the present embodiment is applicable to a communication device that is installed inside a subscriber's home to be controlled by the communication common carrier, such as home gateway, and so forth, or a communication device that is installed inside a local office of the communication common carrier to be controlled by the communication common carrier, such as a MPLS-TP (Multi Protocol Label Switching-Transport Profile) device, and so forth.

In the case of Japanese Unexamined Patent Publication No. Hei11(1999)-259386 described in the foregoing, the technology according to Japanese Unexamined Patent Publication No. Hei11(1999)-259386 is applied to the client machine controlled by the subscriber, and the server machine controlled by the service provider, however, the communication common carrier for providing a network function is not involved. Meanwhile, a configuration of the communication device according to the present embodiment is applied to a communication device administered by the communication common carrier. The invention has a feature in that both the subscriber and the service provider simply make use of the communication service guaranteeing isochronism in the carrier network, provided by the communication common carrier, and neither the subscriber nor the service provider have need for adding, and executing any function to their own communication devices, and so forth.

In FIG. 1, the subscriber terminal 100 communicates with the destination server 200 by making use of the communication service provided by the communication common carrier via the communication device 10 of the communication common carrier, whereupon the subscriber makes use of service provided by the destination server 200. Further, all the communication devices 10 in the administrative responsibility range of the communication common carrier, namely, the carrier network, are under control of an administrator terminal 210 of the communication common carrier, for administering those communication devices by use of a control signal 220, and so forth.

The communication device 10 of the communication common carrier, with the subscriber terminal 100 connected thereto, makes use of time serving as a unique identifier provided so as to be imparted to a packet from the subscriber, accepted inside the carrier network. The communication device 10 is therefore provided with a function for implementing time synchronization with the communication devices in the net by making use of a time acquisition function such as GPS (Global Positioning System), and so forth, or a time synchronization function such as IEEE 1588 v2, NTP (Network Time Protocol) and so forth.

The communication device 10 of the communication common carrier, with the subscriber terminal 100 connected thereto, is provided with a sequence-information impartation function 20 for indicating sequence of acceptances by the net to packets received from the subscriber. Sequence-information includes time information held by the communication device 10, acquired from a clock in time synchronization with other communication device 10.

Further, with the communication device 10 having a high-speed network interface, it is assumed that a plurality of packets are received from the subscriber within an identical time indicated by the clock that is held by the communication device 10. The sequence-information can be comprised of the time information, and addition information so as to enable the communication device 10 to refer thereto as reference information when such packets as described are lined up in the sequence of acceptances. Information applicable to the addition information includes a sequence number (i. e., 0, 1, 2, . . . ), a cumulative byte count (e. g., 0, 64, 128, . . . ) at a relevant port within an identical time, a clock count value of a HW (Hardware), an optional integer value as set on a device-by-device basis, and so forth.

Now, the sequence number represents the simplest mechanism for identifying a sequence inside the same device. Further, the cumulative byte count can indicate a relative position in the minimum notch interval of a clock in the case where packets are inputted to the network interface at a wire rate. For the clock count value of a HW timer of, for example, an input processing unit, use is made of a HW clock value finer than the minimum notch interval of the clock, so that it is possible to indicate a relative position in finer granularity than that in the case where the cumulative byte count is applied. The optional integer value has an effect of allocating precedence to the respective communication devices in advance. In this case, if the optional integer value is combined with the sequence number, this will make it possible to decide a sequence between the communication devices on the basis of the optional integer value, and to decide a sequence inside each of the communication devices on the basis of the sequence number.

In the case where a net is constructed by the communication devices 10 that are identical in configuration to each other, in particular, the respective communication devices 10 can be assumed to be operating at an identical frequency, so that use of the HW clock value as the addition information makes it possible to facilitate mounting, and to realize high precision at the time of lining up a plurality of packets transmitted from a plurality of sources, having sequence-information indicating an identical time.

As will be described in detail later with reference to FIG. 2, the communication device 10 of the communication common carrier, with the subscriber terminal 100 connected thereto, adjacent to the subscriber, is provided with a delay function for delaying sending-out of a packet received from the subscriber into the network by optional time as predesignated. Delay time that would have originally been present at the communication device 10 of the communication common carrier, with the destination server 200 connected thereto, adjacent to the service provider, will be used up within the communication device adjacent to the subscriber by virtue of the delay function. In this connection, with the communication device 10 with the destination server connected thereto, adjacent to the service provider, the communication device 10 being in communication with a multitude of the subscriber terminals, there will arise the need for a buffer for allowing all packets that are assumed to be received from the respective subscriber terminals to temporarily stand by during adequate latency time required from transmission delay in the net. However, because the adequate latency time at the communication device 10 with the destination server connected thereto can be shortened by virtue of the delay function of the communication device adjacent to the subscriber, it becomes possible to cut back on a buffer capacity to be held by the relevant communication device.

Further, if sequence-information (referred to hereinafter as "existing sequence-information" so as to be distinguished from sequence-information imparted by the carrier network) has already been imparted to a packet received from the subscriber, the communication device 10 of the communication common carrier, with the subscriber terminal 100 connected thereto, is provided with a nullification function for nullifying the existing sequence-information. As for the nullification function of the communication device 10, on the inlet side of the carrier network, if bits are set in an invalid flag field of the existing sequence-information, the net's own sequence-information is additionally imparted regardless of the existing sequence-information, and the existing sequence-information holds time information of the past, this will raise a possibility of misrepresentation as to sequence, so that there are conceivable methods for implementing disposal of the packet itself, unconditional updating of the existing sequence-information to a present value, or unconditional disposal of the packet regardless of a value of the existing sequence-information, so forth, in order to prevent the misrepresentation. Furthermore, if the existing sequence-information indicates a future time, this is determined as an instruction for a send-out hold function for holding the packet on the outlet side of the net until a designated time, allowing the packet, as it is, to be transmitted on the inlet side of the net. Further, as will be described later on, the carrier network's own sequence-information is provided with time information, and addition information.

Meanwhile, the communication device 10 of the communication common carrier, with the destination server 200 connected thereto, is provided with a packet lining-up send-out function 30 for delaying sending-out of packets to be sent out to an identical address by optional time as predesignated, and lining up the packets according to the sequence-information imparted to the packets, respectively, by the sequence-information impartation function 20 of the communication device 10 on the inlet side of the net before sending out each of the packets to the address. At this point in time, since the time information in the sequence-information indicates a time when each of the packets is accepted by the net, the communication device 10 sequentially sends out the packets by starting from the packet accepted at the earliest time. The packet lining-up send-out function 30 according to the sequence-information sends out a relevant packet to the address at acceptance timing in accordance with the sequence in which the packets are accepted.

Thus, the communication device 10 of the communication common carrier, with the destination server 200 connected thereto, is provided with a function for determining the context of the sequence-information by the agency of the packet lining-up send-out function 30 according to the sequence-information. The context of the sequence-information is decided according to the context of time information in the sequence-information. Further, the context of the sequence-information can be determined according to the time information and addition information in consideration of the acceptance of plural packets within an identical time. The addition information includes a field value indicating preference in a packet, the sequence number previously described, and so forth, or both thereof.

By referring to, for example, a field indicating preference in a packet, it will be possible to control lining-up sequence in accordance with not only the sequence of acceptances by the net but also preference imparted by the subscriber or the communication common carrier. Further, the field indicating preference in a packet includes a MPLS-TC (Traffic Class) field, VLAN (Virtual Lan) tag-CoS (Class of Service) field, ToS (Type of Service) field inside an IP (Internet Protocol) packet, and so forth.

The communication device 10 of the communication common carrier, with the destination server 200 connected thereto, attempts to line up packets in accordance with sequence-information imparted to each of the packets. However, in preparation for the case where a plurality of packets each hold identical sequence-information, the communication device 10 is provided with a function for selecting a packet to be first sent out from among those packets. A sequence-decision method that is adopted if the plural packets hold identical sequence-information includes a method for complying with a sequence to sort within a buffer, such as a receive-queue and so forth, for use in holding a received packet of the communication device 10 for lining up packets, and a random-selection method. As the random-selection method, there can be cited, for example, a selection method for making use of a random number as an index indicating entry in the receive-queue.

As described above, the communication device 10 of the communication common carrier, with the destination server 200 connected thereto, is provided with the packet lining-up send-out function 30 for delaying sending-out of a packet to be sent out to the outside of the net until a time indicated by the time information in the sequence-information. By the agency of this function, information can be distributed from the net to the address within designated time.

The communication device 10 of the communication common carrier, with the destination server 200 connected thereto, is provided with a function for nullifying the sequence-information imparted by the net regarding a packet sent out from the net to the destination server 200 while validating the sequence-information nullified by the communication device 10 on the inlet side of the net, if any, thereby restoring the state of the packet accepted by the net.

Figure 2:
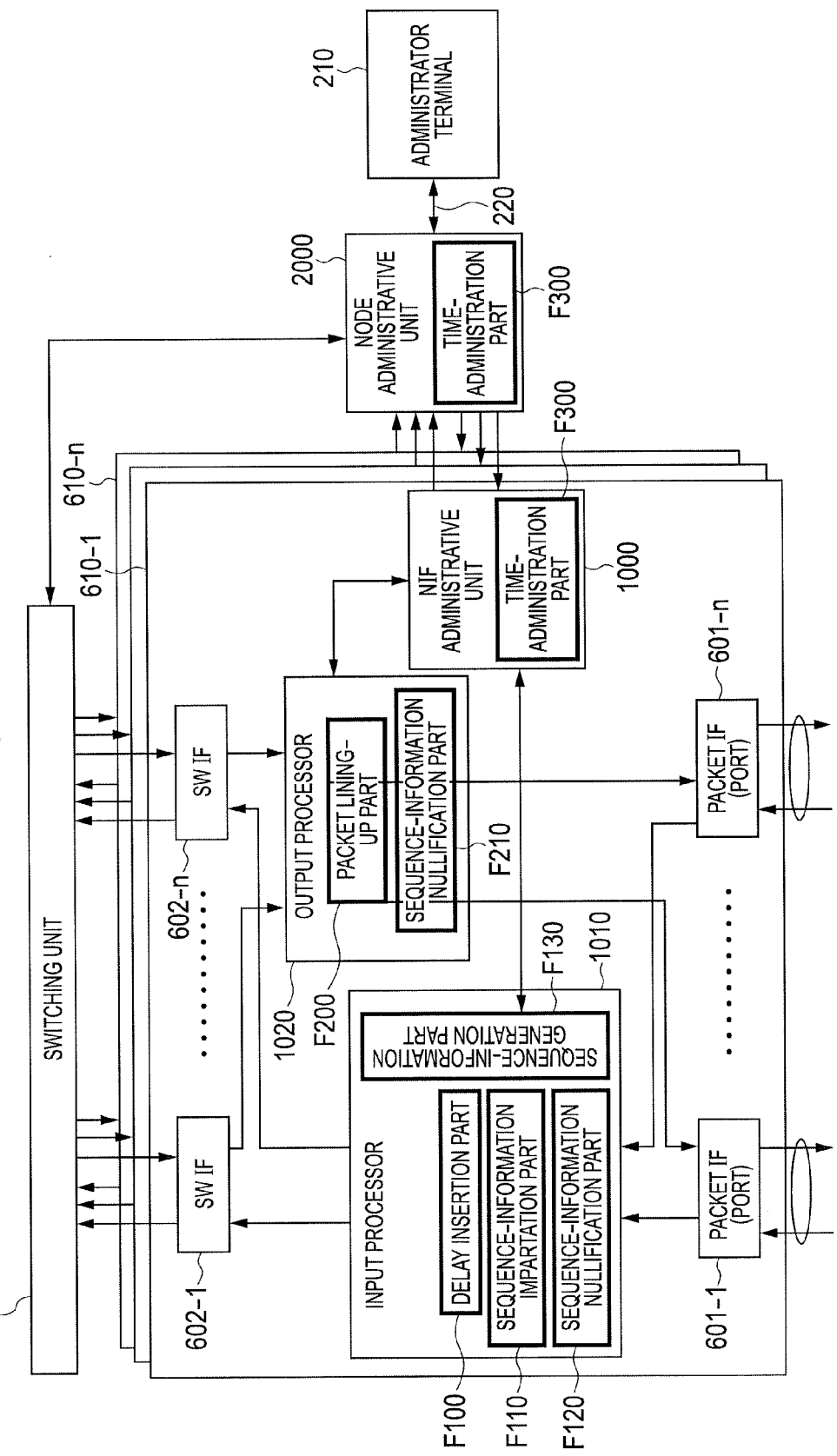
FIG. 2 is view showing an internal structure of a communication device according the first embodiment by way of example.

FIG. 2 shows an internal structure of the communication device 10 as a node in the carrier network according to the present embodiment, shown in FIG. 1, by way of example. The communication device 10 shown in FIG. 1 is comprised of a node administrative unit 2000 for administering the device in whole, a plurality of network interfaces 610-1 to 610-*n*, and a switching unit 2100 for mutually connecting the network interfaces 610-1 to 610-*n*, with each other. Further, in the figure, there is shown the administrator terminal 210 shown in FIG. 1, but it goes without saying that the administrator terminal 210 is positioned outside the communication devices 10, as previously described.

The network interfaces 610-1 to 610-*n* are each comprised of packet transmit-receive ports 601-1 to 601-*n*, making up a packet transmit-receive unit, interfaces 602-1 to 602-*n*, with the switching unit 2100, corresponding to the respective packet transmit-receive ports, an input processor 1010 for processing packets received via the packet transmit-receive unit, an output processor 1020 for processing transmission of packets via the packet transmit-receive unit, and a network interface (Network Interface: NIF) administrative unit 1000. The input processor 1010, and the output processor 1020, among constituents of the network interface, can be realized through program processing by at least one central processing unit (CPU) of a processing unit. Needless to say, a special-purpose hardware configuration may be adopted for either of processors.

Meanwhile, the node administrative unit 2000 is for providing the administrator of the communication device with an interface for administration to thereby enable various kinds of settings/operations to be applied to the relevant communication device. The node administrative unit 2000 similarly retains a processor and a memory, and is capable of holding, and setting initialization information necessary for initialization of the communication device. The node administrative unit 2000 executes initialization of respective functions inside the communication device 10 on the basis of initialization information stored in the memory, or a default value held by the node administrative unit 2000 at the time of initialization of the relevant communication device. Setting/operation, applied to the node administrative unit 2000 by the administrator using the administrator terminal 210, is reflected as appropriate on the NIF administrative unit 1000 of a suitable one of the network interfaces 610-1 to 610-*n*, installed in the communication device. Time-administration parts F300, installed in the node administrative unit 2000, and the NIF administrative unit 1000, respectively, will be described in detail later on.

The input processor 1010 is included in each of the network interfaces 610-1 to 610-*n* of the communication device 10 described as above, and further, the input processor 1010 is provided with function blocks including a delay insertion part F100, a sequence-information impartation part F110, a sequence-information nullification part F120, and a sequence-information generation part F130. Needless to say, each of these functions, indicated by a thick and solid line, can be realized through program processing by a processing unit of the input processor 1010, such as a CPU, and so forth, as described above.

These functions described make up the sequence-information impartation function 20 for indicating the sequence of acceptances by the net to the packets received from the subscriber. The delay insertion part F100 performs a function for delaying sending-out of each of the packets received from the subscriber into the net by optional time as predesignated. The sequence-information impartation part F110 performs a function for imparting sequence-information using a time as a unique identifier for indicating the sequence of acceptances inside the net to the packet accepted from the subscriber. A method for such impartation is the same method as previously described. The sequence-information nullification part F120 is a function for nullifying the existing sequence-information if the sequence-information (the existing sequence-information) has already been imparted to a packet received from the subscriber. A method for such nullification, as well, is the same method as previously described. The sequence-information generation part F130 is a function for generating sequence-information such as time information making use of a time as a unique identifier for indicating the sequence of acceptances to a packet accepted from the subscriber, and so forth. Further, the sequence-information generation part F130 is provided with a function for adding the addition information that is previously described, including the field value indicating preference in a packet, the sequence number, and so forth, or both, in order to determine the sequence of acceptances of packets afterward even when a plurality of packets are accepted at an identical time, thereby generating the sequence-information.

The output processor 1020, included in each of the network interfaces 610-1 to 610-*n* of the communication device 10 described as above, is provided with a packet lining-up part F200, and a sequence-information nullification part F210. Needless to say, each of these functions, indicated by a thick and solid line, can be realized through program processing by a processing unit of the output processor 1020, such as a CPU, and so forth, as described above. These functions described as above make up the packet lining-up send-out function 30 according to the sequence-information described with reference to FIG. 1.

The packet lining-up part F200 causes sending-out of packets to be sent out to the same address to be delayed by optional time as predesignated, thereby lining up the packets according to the sequence-information imparted to the respective packets before sending out the packets to the address. Because the time information in the sequence-information indicates a time at which the packets each are accepted by the net, the packets are sequentially sent out by starting from the packet whose relevant acceptance time is the earliest time. Further, the relevant function is for sending out the relevant packet to the address at timing of acceptance, in accordance with the sequence of packet acceptances. The sequence-information nullification part F210 represents a function for nullifying sequence-information imparted by a packet at the communication device on the inlet side of the carrier network while validating sequence-information nullified by the communication device on the inlet side of the net, if any, thereby restoring the state of a packet accepted by the net.

Thus, with the communication device according to the present embodiment, the input processor 1010 and the output processor 1020 are provided in each of the network interfaces 610-1 to 610-n. However, the communication device can be controlled so as to cause either the input processor 1010 or the output processor 1020 to perform its function depending on whether the relevant communication device is connected to the subscriber terminal 100 or to the destination server 200. In other words, it is possible to cause a CPU to selectively run a program for input processing, or a program for output processing. Otherwise, it is possible to cope with this by causing either of the special-purpose hardware processors to function.

Now, in the network system according to the present embodiment, the communication device 10 is comprised of the NIF administrative unit 1000 and the node administrative unit 2000, each of which is provided with the time-administration part F300. The time-administration part F300 according to the present embodiment realizes a mechanism for administering a synchronized time between the communication devices for guaranteeing isochronism, that is, between the communication devices in the administrative responsibility range of the communication common carrier. The isochronism guarantee in the case of the present embodiment is described hereinafter.

First, the node administrative unit 2000 acquires a synchronized time. As an existing method for acquiring the synchronized time, a time is acquired from, for example, a GPS device connected to the node administrative unit 2000, and a time is synchronized between the communication devices adjacent to each other by use of IEEE 1588, or a synchronized time is acquired from an NTP server (not shown), and the administrator terminal 210.

Thereafter, the time-administration part F300 of the node administrative unit 2000 distributes the relevant synchronized time to the time-administration part F300 in the NIF administrative unit 1000 of each of the network interfaces 610-1 to 610-n, whereupon the relevant synchronized time is administered by the time-administration part F300 of the NIF administrative unit 1000. Then, in the case of the input processor 1010, and the output processor 1020, in each of the network interfaces 610-1 to 610-n, respectively, making use of time information, isochronism inside the administrative responsibility range 2 of the communication common carrier is guaranteed by referring to the time in the time-administration part F300 in the NIF administrative unit 1000 of the relevant network interface.

Figure 3:
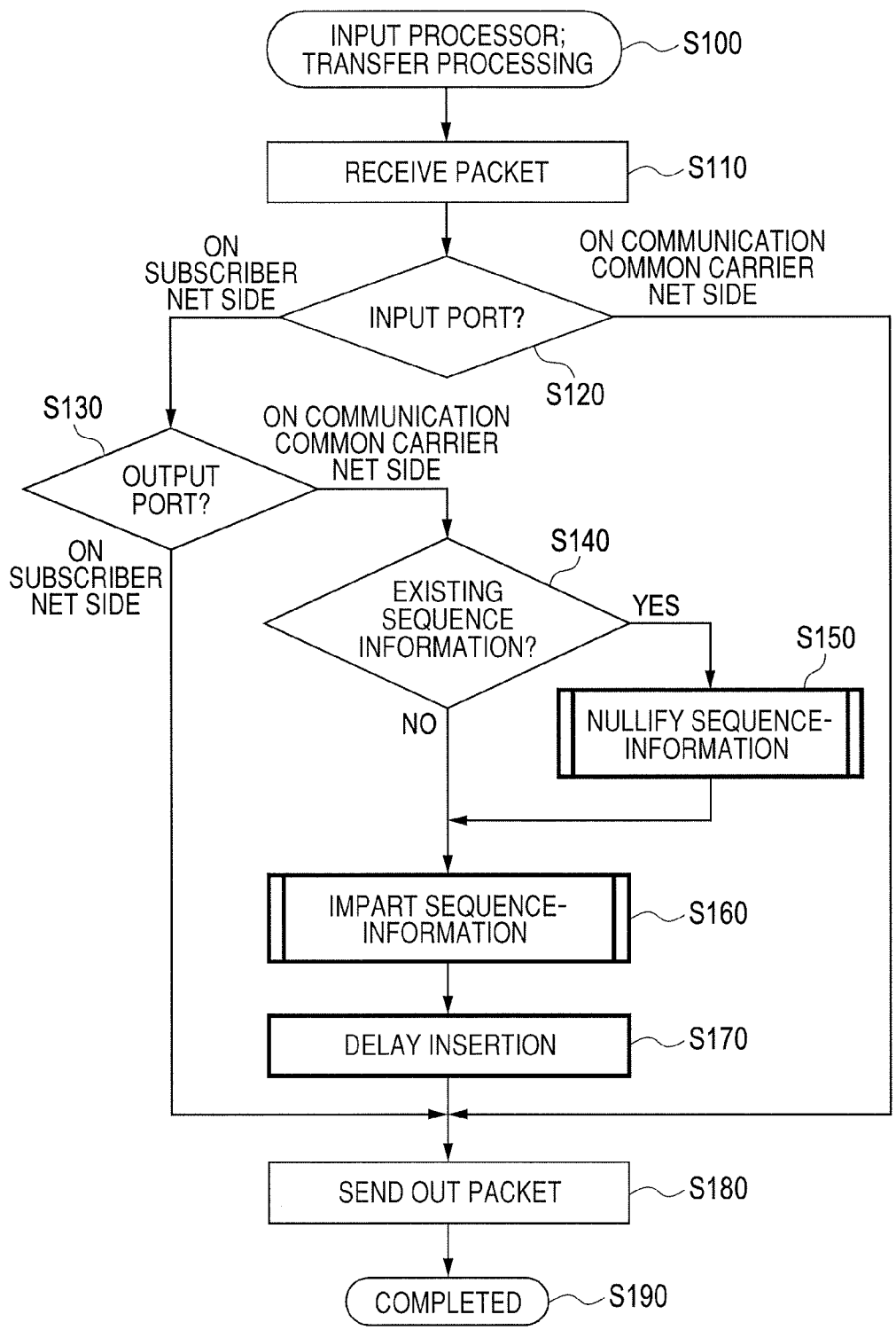
FIG. 3 is a view showing an example of a process flow for packet transfer in an input processor according the first embodiment.

FIG. 3 shows a specific example of a process flow for packet transfer by program processing of the CPU, and so forth, making up the input processor 1010 inside the communication device 10 shown in FIG. 2 (S100).

First, the input processor 1010 receives a packet from each of the network interfaces 610-1 to 610-n (S110). The input processor 1010 refers to table information pre-stored in a memory, an IP source address of a received packet, and so forth, thereby determining whether an input port of the received packet is on a side of the net, adjacent to the subscriber, or a side of the net, adjacent to the carrier network (S120). If the input port of the received packet is on the side of the net, adjacent the subscriber, the input processor 1010 refers to the IP source address, and so forth, thereby determining whether an output port of the received packet is on the side of the net, adjacent the subscriber, or on the side of the net, adjacent to the carrier network (S130).

If the input port of the received packet is on the side of the net adjacent to the subscriber, and the output port thereof is on the side of the net adjacent to the carrier network, the input processor 1010 determines whether sequence information has already been imparted to the relevant packet (S140). If the sequence information has already been imparted, the sequence-information nullification part F120 executes processing for sequence-information nullification (S150). Thereafter, the sequence-information impartation part F110 imparts the net's own sequence-information that is generated by the sequence-information generation part F130 to the relevant packet (S160). Further, if delay time is predesignated for a relevant address, the delay insertion part F100 adjusts timing for reading from a memory such as a buffer, and so forth, thereby delaying processing for transfer of the relevant packet by designated time (S170). Further, both the sequence information, and the delay time, in the packet, will be described in detail with reference to a drawing later on.

With the network system according the present embodiment, in the communication device for executing the output processing of packets, respective packets sent out from a plurality of communication channels are temporarily retained in a buffer, and so forth, before execution of processing for lining-up the packets, as will be described later on. However, in the case where there exist a multitude of communication channels for an address to which the output processing is directed, or there exists a large difference in transfer-delay among communication channels, a buffer for temporarily retaining a large number of packets is needed in order to execute processing for lining-up. Accordingly, at the communication device for executing input processing, processing for packet transfer can be delayed by given time (S170), that is, by providing the relevant communication device as well with a buffer to thereby temporarily retain the packets therein, and to delay the processing for packet transfer, it possible to cut back a buffer capacity that otherwise need be prepared at the communication device on the output side of the net.

This is effective particularly when making up a net of a configuration where communications converge on one spot, as in the case of on a many-to-one basis. In order to transfer a packet from the input processor to the switching unit, the relevant packet is sent out to SW IF corresponding to an address (S180), whereupon the processing for the relevant transfer is completed (S190).

Figure 4:
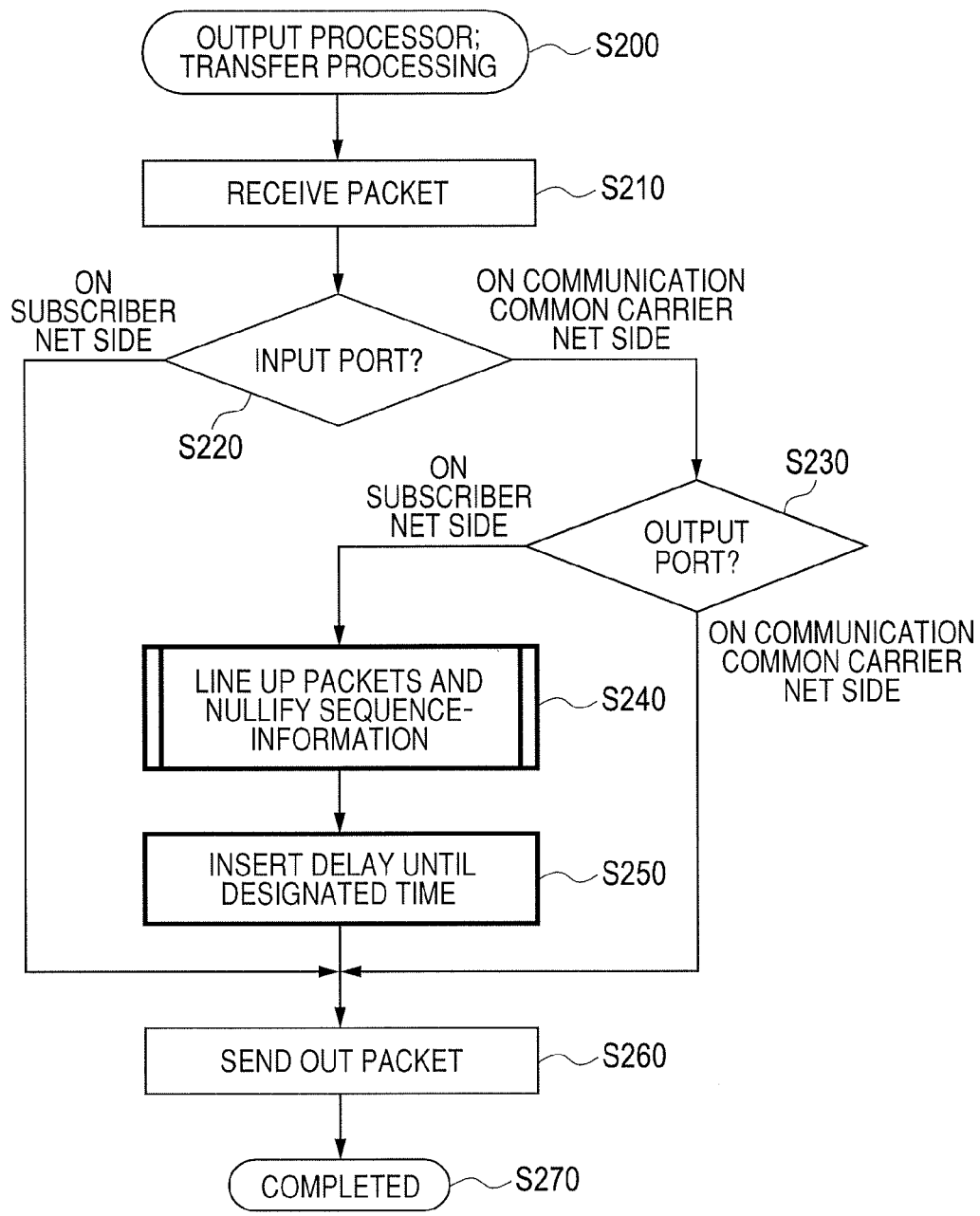
FIG. 4 is a view showing an example of a process flow for packet transfer in an output processor according the first embodiment.

FIG. 4 shows one example of a process flow (S200) for packet transfer by program processing of the CPU, and so forth, making up the output processor 1020 inside the communication device 10 shown in FIG. 2. The output processor 1020 receives a packet from SW IF 602-1 to 602-n, respectively (S210). The CPU and so forth of the output processor 1020 refer to an IP address of a received packet, and so forth, thereby determining whether the input port of the received packet is on the side of the net, adjacent the subscriber, or the side of the net, adjacent to the carrier network (S220). If the input port of the received packet is on the side of the net, adjacent to the carrier network, the CPU, and so forth determine whether the output port of the received packet is on the side of the net adjacent to the subscriber, or the side of the net adjacent to the carrier network (S230). If the input port of the received packet is on the side of the net adjacent to the carrier network and the output port of the received packet is on the side of the net adjacent to the subscriber, the packet lining-up part F200 executes processing for delaying the lining-up of packets, and the sequence-information nullification part F210 executes processing for sequence-information nullification (S240). If sequence information indicating an acceptance time at the communication device is imparted to the packet, a time at which the relevant packet is processed by the output processor 1020 is after a time at which the processing for lining-up is executed, and conditional expression (1) is therefore satisfied as follows.

$$t+D\max \leq tn \qquad (1)$$

where t is an acceptance time of a packet, Dmax is a maximum value of transfer-delay in plural communication channels between an address of the relevant packet and a source thereof, and tn is a present time.

Meanwhile, a time indicating a future time after a present time, instead of an acceptance time at the communication device, can be imparted to the packet. In this case, the conditional expression (1) described as above is not satisfied, and a difference Δt between the future time, and the present time can be found by the following expression (2):

$$\Delta t=(t+D\max)-tn \qquad (2)$$

In this case, the processing for packet transfer is delayed by the difference Δt until the relevant time (t+Dmax) (S250). By virtue of this function, the communication device will be able to send out the packet to the subscriber at a designated time, thereby making it possible to implement impartial communication whereby identical information is distributed to a plurality of subscribers at an identical time. In order to transfer the packet from the output processor 1020 to the net, the relevant packet is sent out to the packet transmit-receive port corresponding to the address (S260), whereupon the processing for transfer is completed (S270).

Figure 5:
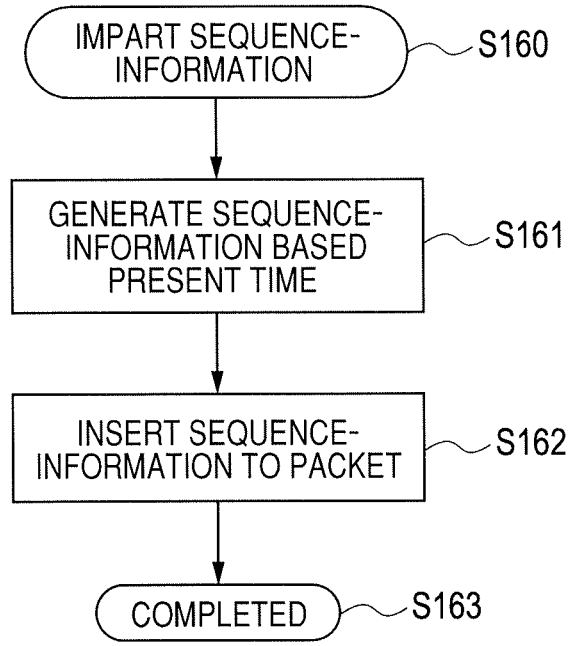
FIG. 5 is a view showing one example of a process flow for sequence-information impartation according the first embodiment.

FIG. 5 shows one example of a process flow (S160) for sequence-information impartation executed by the sequence-information impartation part F110 of the input processor 1010 inside the communication device 10. As described above, the sequence-information generation part F130 acquires present time information from the clock held by the communication device 10 via the time-administration part F300, thereby generating sequence-information (S161). At this point in time, the sequence-information together with the addition information that is previously described can be prepared in order to permit acceptance of plural packets at an identical time. Then, the sequence-information impartation part F110 inserts the sequence-information as prepared into a position of the packet, independently decided as described later on to thereby validate the relevant sequence-information (S162). Processing for sequence-information impartation is completed (S163).

Figure 6:
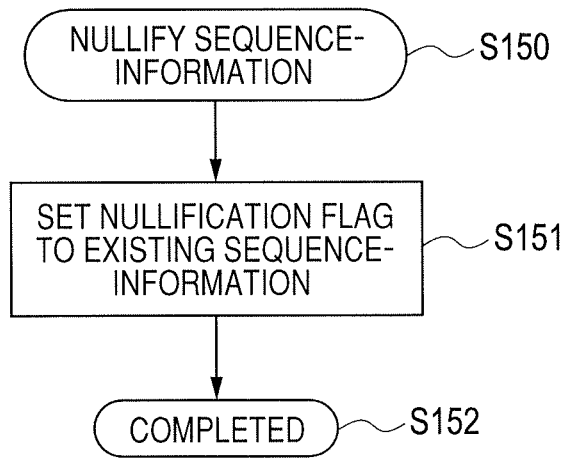
FIG. 6 is a view showing one example of a process flow for sequence-information nullification according the first embodiment.

FIG. 6 shows one example of a process flow (S150) for sequence-information nullification executed by the sequence-information nullification part F120 of the input processor 1010 inside the communication device 10. A nullification technique is applied to the existing sequence-information that has already been imparted to the packet to thereby realize nullification (S151). Processing for sequence-information nullification is completed (S152).

Figure 7:
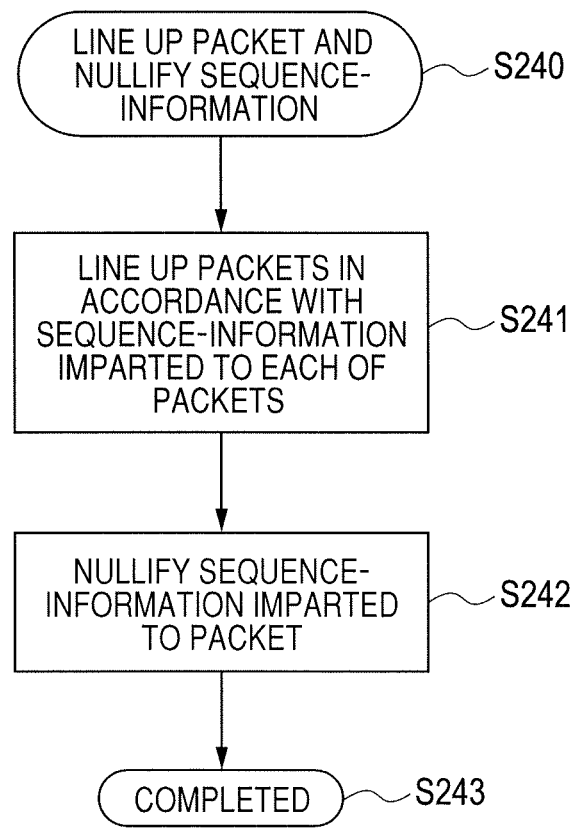
FIG. 7 is a view showing one example of a process flow for packet lining-up and sequence-information nullification, according the first embodiment.

FIG. 7 shows one example of a process flow (S240) for packet lining-up and sequence-information nullification, in the output processor 1020 inside the communication device 10. First, all the packets that have been received in predesignated time are lined up in sequence of acceptances by the net, in accordance with the sequence-information imparted to each of the packets by the communication device 10 on the inlet side of the net (S241). Then, the sequence-information that is independently imparted by the net is nullified, and further, the existing sequence-information that has been nullified in a step S150 of the process flow of FIG. 3, if nay, is validated to thereby restore a relevant packet (S242), whereupon processing for packet lining-up and sequence-information nullification is completed (S243).

Figure 8:
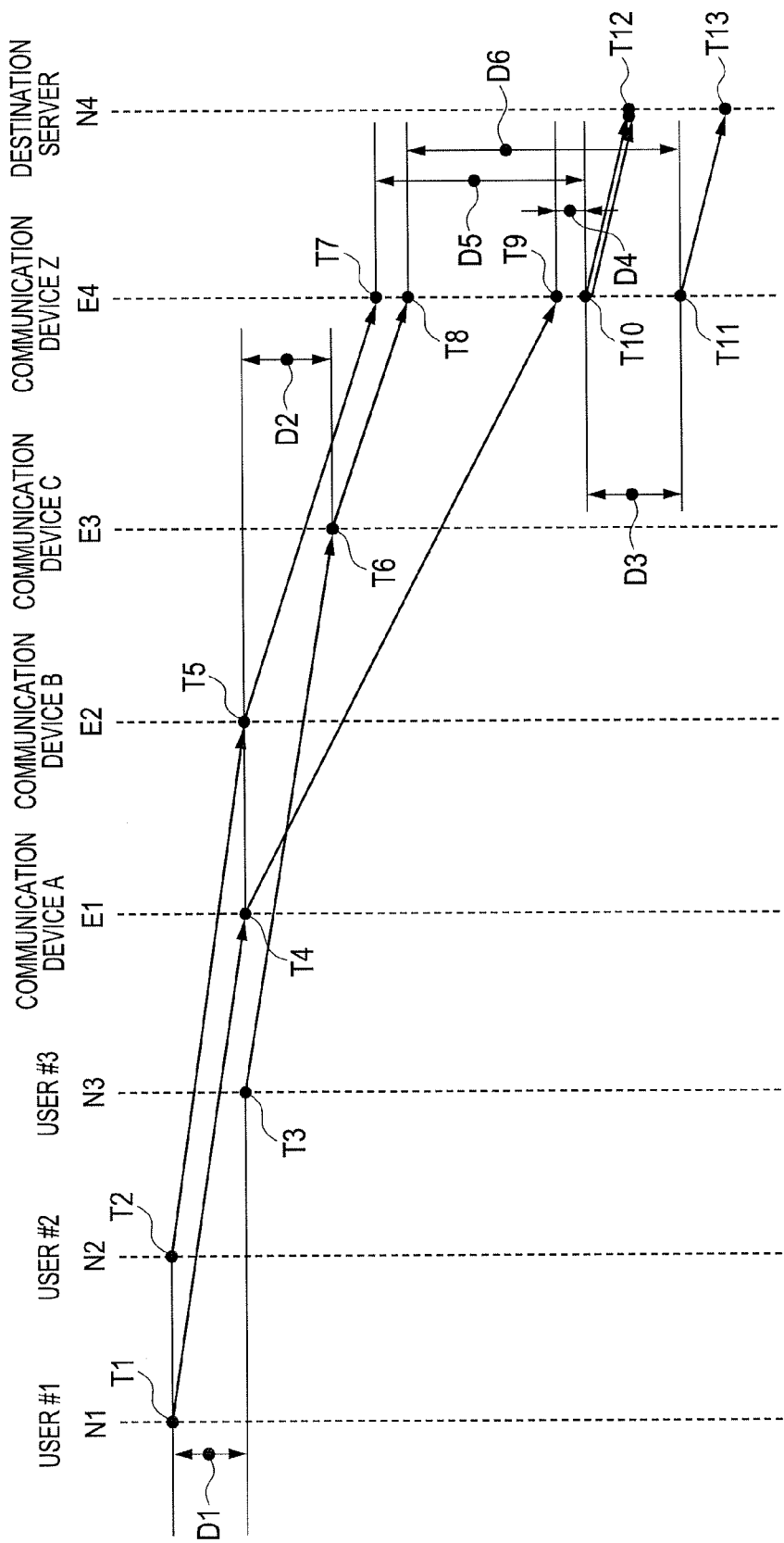
FIG. 8 shows a timing chart of one example in which a network system according to the first embodiment provides users with isochronism.

FIG. 8 shows a timing chart of one example in which a network system according to the present embodiment provides users with isochronism. In FIG. 8, there is shown an example in which respective users #1 (N1), #2 (N2), and #3 (N3) make use of service provided by a destination server (N4) via a network system comprised of the communication devices A (E1), B (E2), C (E3), and Z (E4), indicating at what timing packets sent out by the respective users arrive at the destination server via the network system (N4).

In this case, the user #1 (N1), and the user #2 (N2) each send out a packet toward the destination server (N4) at an identical time (T1, T2, respectively). Subsequently, the user #3 (N3) sends out a packet toward the destination server (N4) at a time T3. At this point in time, there exists a time difference (D1) between the time T3, and the time T1, the time T2, respectively. The packets sent out by the users #1 (N1), #2 (N2), and #3 (N3), respectively, arrive at the communication devices A (E1), B (E2), and C (E3), respectively, at the time T4, T5, and T6, respectively. The communication devices each transfer a received packet to the communication device Z (E4) adjacent to the destination server (N4) which is at the address of the packet. The communication device Z (E4) receives the respective packets sent out by the users #1 (N1), #2 (N2), and #3 at a time T9, T7, and T8, respectively. The communication device Z (E4) sends out the respective packets that are addressed to the destination server (N4) to the address after the elapse of delay time of the net, predesignated on a source-by-source basis, from an acceptance time of the net.

After the respective packets are received, the communication device Z (E4) sends out the packet sent out by the user #1 (N1) at a time T10 after the elapse of D4 time from acceptance by the communication device Z (E4), the packet sent out by the user #2 (N2) at a time T10 after the elapse of D5 time from acceptance by the communication device Z (E4), and the packet sent out by the user #3 (N3) at a time T11 after the elapse of D6 time from acceptance by the communication device Z (E4), respectively, to the destination server (N4). Thus, with the network system according to the present embodiment, even if the difference (D1) exists between times at which the respective users send out the packet, a difference (D3) between times at which the packet is sent out to the destination server (N4) is re-realized on the basis of a difference (D2) between times at which the packet has arrived at the respective communication devices making up the network system.

Figure 9:
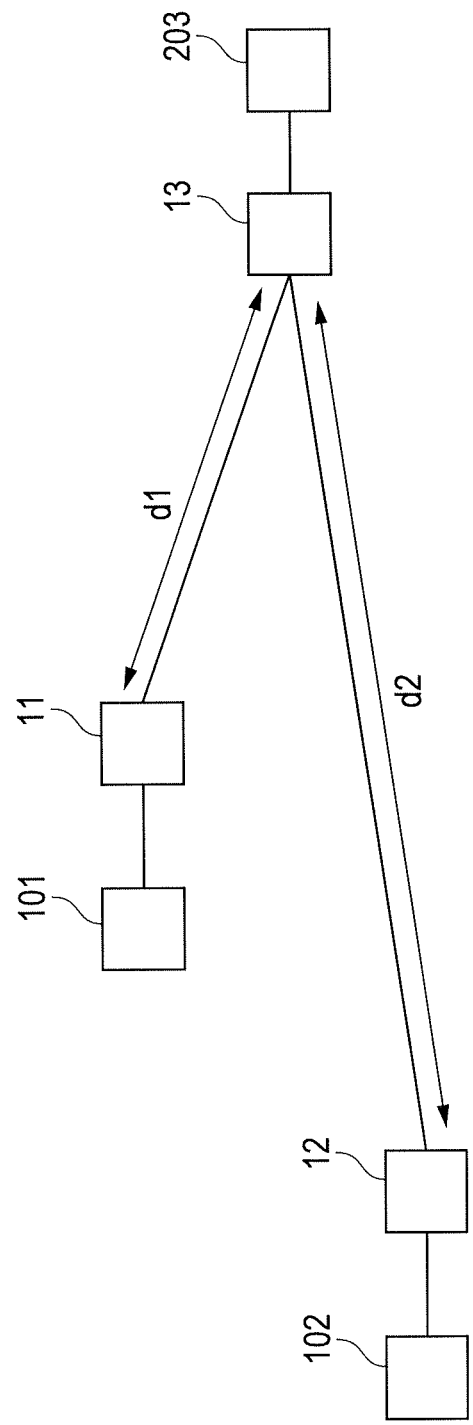
FIG. 9 is view showing a transfer-delay measuring interval between the communication devices, handled by the communication device according to the first embodiment in order to work out various types of delay-time.

FIG. 9 shows a transfer-delay measuring interval between the communication devices in operation in order to work out various types of delay-time described as above to be handled by the communication device according to the present embodiment. In the case where subscribers at client terminals 101 and 102, respectively, make use of service provided by a server 203, the communication common carrier sets up communication channels between the communication devices 11, 13, and between the communication devices 12, 13, respectively, to enable communications to be executed in the respective intervals. In this case, the communication common carrier makes use of a test function for operational management of the net, provided by the communication device via the administrator terminal, thereby conducting measurements on transfer-delay in the communication channel as a test subject. In FIG. 9, there is shown an example in which transfer-delay between the communication devices 11, 13 is d1, and transfer-delay between the communication devices 12, 13 is d2. Now, there is described hereinafter a method for working out predetermined delay time set at the communication device 13, against packets sent out from the respective communication devices 11, 12.

If d2>d1, delay time D1 for the packet sent out from the communication device 11, inserted by the communication device 13, is worked out by the following expression (3):

$$D1 = d2 - d1 \quad (3)$$

Delay time D2 for the packet sent out from the communication device 12, inserted by the communication device 13, is worked out by the following expression (4):

$$D2 = 0 \because d2 > d1 \quad (4)$$

Further, at this point in time, a largest delay time in the communication channel as the test subject is referred to as the maximum delay time Dmax. Accordingly, in the case of this example, the communication device 13 sends out the packet to an address after the elapse of the delay time D1 of the packet sent out from the communication device 11. Further, the communication device 13 sends out the packet to the address after the elapse of the delay time D2 of the packet sent out from the communication device 12, that is, immediately after the receipt of the packet. However, it is when the following conditional expression (5) is satisfied by time information ti in the sequence-information of a packet to be transferred that the communication device sends out the packet to the address.

$$ti + Di \geq tn + Dmax \quad (5)$$

where Di is predetermined delay time to be inserted into a relevant source i, and tn is the present time.

If the conditional expression (5) is not satisfied, in other words, if time information imparted to a packet designates a time in the future, a relevant packet is stored in a buffer in a relevant communication device until the conditional expression (5) is satisfied, and the transfer of the packet to an address is delayed. By imparting future time information inside the sequence-information of a packet transferred by the communication device, the communication device can distribute the packet to an address at a designated time irrespective of transfer delay. This makes it possible for a server providing service to concurrently distribute information to the users of the service on an impartial basis.

Figure 10:
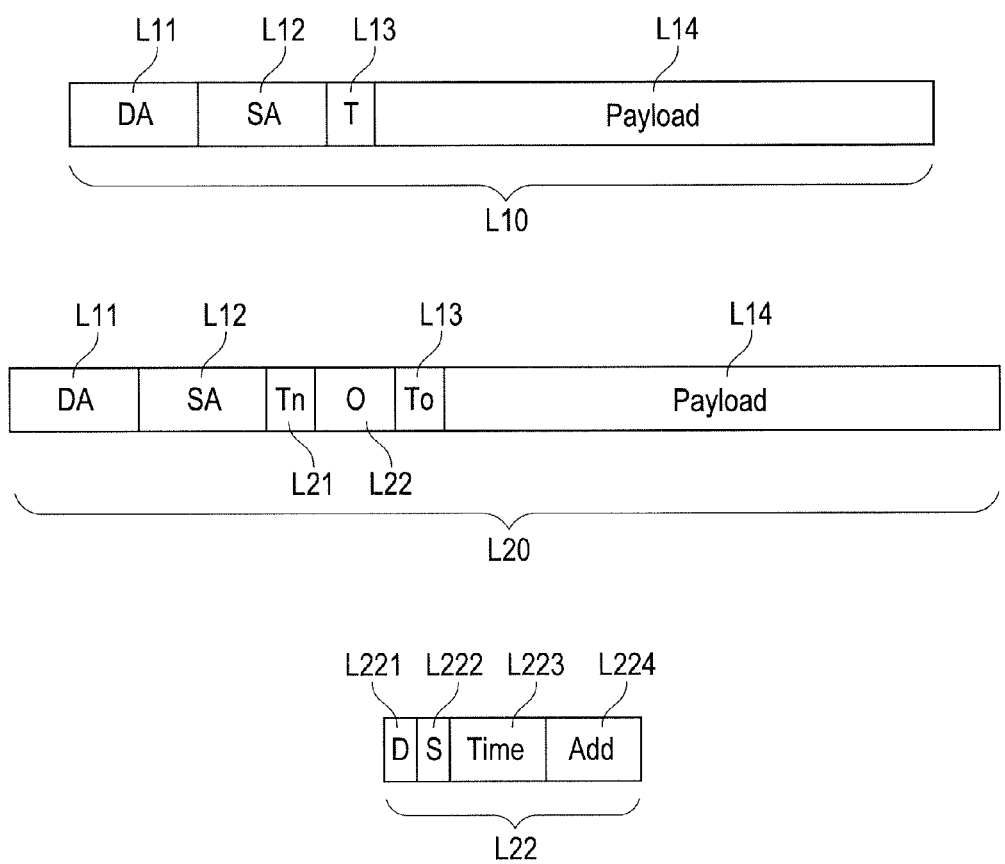
FIG. 10 shows a layout of respective fields making up a packet handled by the communication device according to the first embodiment by way of example.

FIG. 10 shows a layout of respective fields making up a packet handled by the communication device 10 according to the present embodiment by taking an Ethernet (registered trademark) frame as an example. In the figure, reference numeral L10 denotes the standard Ethernet frame, L20 a packet with sequence-information, and so forth, according to the present embodiment, inserted therein, and L22 the sequence-information.

First, the Ethernet frame L10 is comprised of a destination address (DA) L11, a source address (SA) L12, a type value (T) L13, and a payload L14. Upon acceptance of the Ethernet frame L10 from a subscriber, the communication device 10 makes up the packet L20 with a new type value (Tn) L21 and sequence-information (O) L22, inserted between the source address (SA) L12, and the type value (T) L13, thereby transferring the packet L20 into the net of the administrative responsibility range of the communication common carrier.

If the sequence-information has already been imparted to the packet accepted from the subscriber, new sequence-information is inserted between the new type value (Tn) L21, and the relevant sequence-information L22. More specifically, with the packet holding sequence-information, the field of the new type value (Tn) L21 indicating holding of sequence-information is always one field irrespective of the number of sequence-information pieces that are held therein. For the new type value L21, use is made of a unique value that has been applied for LANA (Internet Assigned Number Authority) responsible for administration of type values.

The sequence-information (O) L22 is comprised of a nullification flag (D) L221, a last sequence-information flag (S) L222, time information (Time) L223, and addition information (Add) L224. The nullification flag (D) L221 indicates whether or not the relevant sequence-information should be referred to within the net. If this flag (D) is set, the communication device does not refer to the relevant sequence-information at the time of deciding transmission sequence. The last sequence-information flag (S) L222 is set at the last sequence-information that is referred to by the communication device. When the sequence-information L22 is imparted inside the packet, a relevant flag is set at sequence-information that is first imparted. When the sequence-information L22 is newly imparted to a packet to which the sequence-information has already been imparted, the last sequence-information flag L222 of the sequence-information to be inserted is not set. The time information L223 indicates a time when the communication device 10 has accepted a packet, or a future time indicating a time of distribution of a relevant packet, as described in the foregoing. For the addition information L224, use is made of information imparted by the communication device in order to identify the sequence of packets accepted at an identical time, such as, for example, the HW clock-count value of the HW timer of the CPU, and so forth.

Upon the communication device 10 accepting the packet L10 from a subscriber, the communication device 10 makes up the packet L20 with the time information imparted thereto, transferring the packet L20 toward an address. At a time when the relevant packet is transferred within the net of the administrative responsibility range of a communication common carrier to be subsequently sent out from the net of the communication common carrier, the communication device 10 removes the sequence-information imparted when the packet is accepted, thereby restoring the packet L10 generated at the time of acceptance before sending out. Thus, with the system according to the present embodiment, since the packet L10 that has been accepted from the subscriber is restored on the outlet side of the net, the subscriber can continuously make use of the service that has so far been in use without any alteration even in the case of making use of the net providing isochronism.

Further, upon acceptance of the packet L20 with the existing sequence-information from the subscriber, imparted thereto, the communication device 10 sets the nullification flag of the relevant existing sequence-information, thereby newly inserting sequence-information. At a time when the relevant packet is transferred within the net to be subsequently sent out from the net of the communication common carrier, the communication device 10 removes the sequence-information imparted when the packet is accepted, and releases the nullification flag set at the existing sequence-information that has already been imparted when the packet is accepted, thereby restoring the packet L20 generated at the time of acceptance before sending out. Accordingly, even if the subscriber executes communications by use of sequence-information identical in format to the sequence-information that the subscriber makes use of in the net, the relevant packet can be transferred in a passing manner without affecting an isochronism guarantee function provided by the net of the administrative responsibility range of the communication common carrier.

Further, in the case of the subscriber or the server executing processing by making use of sequence-information, if a relevant communication device is set by the communication common carrier sets, it is possible to transfer sequence-information that is originally to be removed at the outlet of the net, as it is. As a result, the sequence-information imparted by the carrier network having no possibility of misrepresentation, instead of the existing sequence-information imparted by the subscriber having a possibility of misrepresentation, can be referred to even on the outside of the net, so that this will make it possible for a server and so forth, providing service, to provide an additional service using highly reliable sequence-information.

Further, if a packet accepted from the subscriber is a MPLS (Multi-Protocol Label Switching) frame instead of the Ethernet frame in the case of the embodiment described as above, the sequence-information L22 imparted by the communication device is inserted between the MPLS Label, and Payload transmitted through MPLS. By so doing, sequence-information is processed by the communication device 10, as is the case with Ethernet (registered trademark), even if the packet accepted from the subscriber is the MPLS frame.

Further, it is to be understood that the invention should not be limited to the embodiment described in the foregoing, and that various changes and modifications may be made in the invention without departing from the spirit and scope thereof. For example, the embodiment described as above is described in detail in order to explain about the invention with greater ease, and the invention is not necessarily limited to the embodiment having all the configurations described as above. Further, one part of the configuration of an embodiment of the invention can be replaced with the configuration of another embodiment of the invention, and the configuration of another embodiment of the invention can be added to the configuration of an embodiment of the invention. Still further, another configuration can be added to, deleted from, or replaced with part of the configuration of each embodiment of the invention.

Furthermore, as for each of the configurations, functions, processors, processing means, and so forth described in the foregoing, part or the whole thereof may be realized by dedicated hardware, for example, by designing and so forth of an integrated circuit. It goes without saying that information for realizing the respective functions, such as a program, table, file, and so forth, can be placed in a memory, respective storage units of a hard disk, SSD (Solid State Drive), and so forth, or in respective storage media of an IC card, SD card, DVD (Digital Versatile Disc), and so forth, and the information can be down-loaded, or installed via a network, and so forth, as necessary.

What is claimed is:

1. A network system comprising:
a first communication node, a second communication node, and a third communication node, located in a network;
wherein the first communication node comprises:
a first receiving unit that receives a first packet from outside of the network;
a first sequence information adding unit that adds first internal sequence information to the first packet, wherein the first internal sequence information is in time synchronization with other communication nodes; and
a first sending unit that sends the first packet with the added first internal sequence information to the third communication node;
wherein the second communication node comprises:
a second receiving unit that receives a second packet from outside of the network;
a second sequence information adding unit that adds second internal sequence information to the second packet, wherein the second internal sequence information is in time synchronization with other communication nodes; and
a second sending unit that sends the second packet with the added second internal sequence information to the third communication node;
wherein the third communication node comprises:
a third receiving unit that receives the first packet with the added first internal sequence information from the first communication node via the network and the second packet with the second internal sequence information from the second communication node via the network; and
a third sending unit that sends the first packet and the second packet based on an order of the first internal sequence information and the second internal sequence information to outside of the network; and
wherein the first communication node further comprises a delay insertion unit that causes the first packet to be delayed by a predetermined time according to an address of the first packet before sending the first packet to the third communication node.

2. The network system of claim 1, wherein the first communication node further comprises a sequence information nullification unit (F120) that inactivates external sequence information.

3. The network system of claim 1, wherein the third communication node further comprises a sequence information inactivation unit that inactivates the first internal sequence information and the second internal sequence information before sending the first packet and the second packet to outside of the network.

4. The network system of claim 1, wherein the first internal sequence information includes first time information that indicates a time at which the first packet has been received at the first communication node and the second internal sequence information includes second time information that indicates a time at which the second packet has been received at the second communication node.

5. The network system of claim 4, wherein the first internal sequence information includes a sequence number for identifying a context of the first packet and a fourth packet received from the network, wherein the first packet and the fourth packet are received at a substantially identical time at the first communication node.

6. The network system of claim 4, wherein the first internal sequence information includes a clock count value for identifying a context of the first packet and a fourth packet received from the network, wherein the first packet and the fourth packet are received at a substantially identical time at the first communication node.

7. A communication node comprising:
- a first receiving unit that receives a first packet from outside of a network;
- an input processing unit that adds first internal sequence information to the first packet, wherein the first internal sequence information is in time synchronization with other communication nodes;
- a first sending unit that sends the first packet with the added first internal sequence information to the network;
- a second receiving unit that receives a second packet with second internal sequence information and a third packet with third internal sequence information from the network, wherein the second internal sequence information and the third internal sequence information is respectively in time synchronization with other communication nodes;
- a second sending unit that sends the second packet and the third packet based on an order of the second internal sequence information and the third internal sequence information to outside of the network; and
- a delay insertion unit that causes the first packet to be delayed by a predetermined time according to an address of the first packet before sending the first packet to the network.

8. The communication node of claim 7, further comprises a sequence information nullification unit that inactivates external sequence information.

9. The communication node of claim 7, wherein the communication node further comprises a sequence information inactivation unit that inactivates the second internal sequence information and the third internal sequence information before sending the second packet and the third packet to outside of the network.

10. The communication node of claim 7, wherein the first internal sequence information includes first time information that indicate a time at which the first packet has been received at the communication node, the second internal sequence information and the third internal sequence information respectively include second time information and third time information that indicate times at which the second packet and the third packet have been received at a second communication node in the network and a third communication node in the network respectively.

11. The communication node of claim 10, wherein the first internal sequence information includes a sequence number for identifying a context of the first packet and a fourth packet received from the network, wherein the first packet and the fourth packet are received at a substantially identical time.

12. The communication node of claim 10, wherein the sequence information includes a clock count value for identifying a context of the first packet and a fourth packet received from the network, wherein the first packet and the fourth packet are received at a substantially identical time.

* * * * *